(12) United States Patent
Reid

(10) Patent No.: US 6,411,205 B1
(45) Date of Patent: Jun. 25, 2002

(54) DISPLAY UNIT

(76) Inventor: Dennis Reid, 107 Rodeo Ct., Lafayette, CA (US) 94549

( * ) Notice: Subject to any disclaimer, the term of this patent is extended or adjusted under 35 U.S.C. 154(b) by 0 days.

(21) Appl. No.: 09/337,706

(22) Filed: Jun. 21, 1999

(51) Int. Cl.[7] ................................................. B60Q 1/26
(52) U.S. Cl. .................. 340/468; 307/10.1; 340/323 R; 340/425.5; 340/466
(58) Field of Search ............................ 340/468, 425.5, 340/466, 469, 479, 936, 901, 905, 933, 941, 323 R; 307/10.1; 362/459, 487, 503, 548

(56) References Cited

U.S. PATENT DOCUMENTS

| | | | |
|---|---|---|---|
| 4,264,979 A | * | 4/1981 | Gutowski |
| 4,868,542 A | * | 9/1989 | Thompson ................... 340/479 |
| 4,920,340 A | * | 4/1990 | Mizuno ....................... 340/933 |
| 4,969,082 A | * | 11/1990 | Oho et al. .............. 340/825.07 |
| 5,105,179 A | * | 4/1992 | Smith .......................... 340/468 |
| 5,905,434 A | * | 5/1999 | Steffan et al. ............... 340/468 |
| 6,124,647 A | * | 9/2000 | Marcus et al. .............. 307/10.1 |

* cited by examiner

Primary Examiner—Brent A. Swarthout
(74) Attorney, Agent, or Firm—Donald C. Feix

(57) ABSTRACT

A display for displaying the dial-in selection of information of a racing vehicle for use by a timing tower in racing includes a display unit which displays a numeric amount or alphanumeric data of a dial-in selection of information. The display unit includes electronic driver circuits, and the display unit is constructed to be mounted on a racing vehicle so that the display can be readily seen from outside of the vehicle and at varied distances and angles with respect to the vehicle.

40 Claims, 15 Drawing Sheets

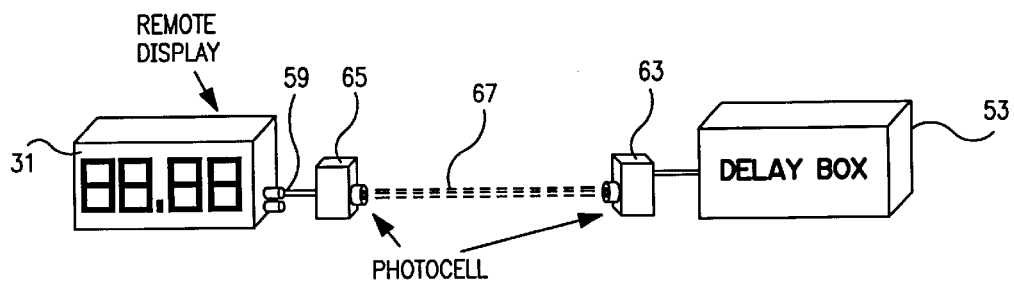
FIG. 6
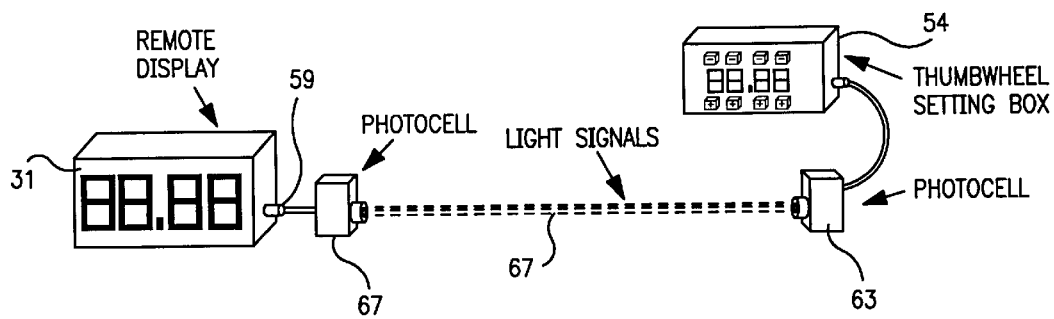
FIG. 7
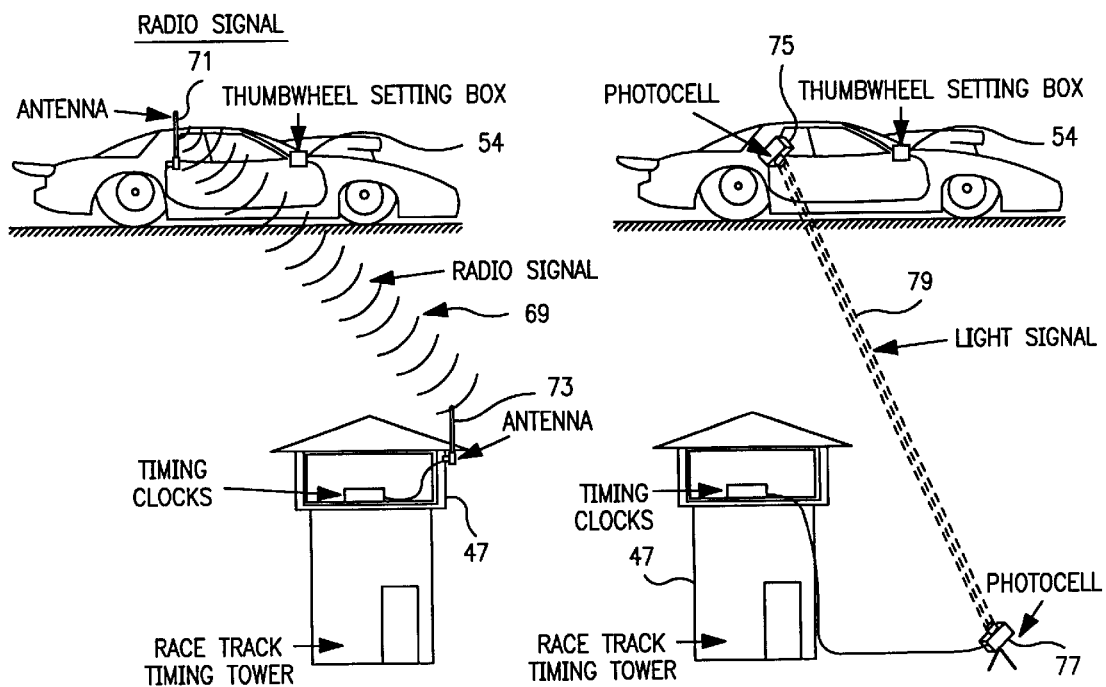
FIG. 8
FIG. 9

DISPLAY UNIT

BACKGROUND OF THE INVENTION

This invention relates to a display for displaying the dial-in selection of information of a racing vehicle for use by a timing tower in racing.

This invention relates particularly to a display in which a display unit is constructed to be mounted on a racing vehicle so that the display can be readily seen from outside of the vehicle at varied distances and varied angles with respect to the racing vehicle.

In the motor sport of drag racing, two vehicles line up next to each other on a starting line and then race down a straight two lane race track until they reach the finish line. There are no curves or turns in the track; it is a straight line acceleration contest.

The race is started by a device called a Christmas tree. The Christmas tree is mounted between the two lanes and consists of an array of vertical lights that count from the top down until a green light near the bottom turns on to signal the start of the race.

The typical Christmas tree has a small light at the top that is called the pre-stage light. This light lets the driver know that he is near the starting line, and it is activated when the car's front tire breaks a light beam shining across the lane before the starting line. The next lower light is the staging light. This light is activated when the car's front tire breaks a light beam shining across the lane right on the starting line. The next series of lights (typically 1 to 5 in number) are amber or yellow in color, and these count down to serve as warning lights to alert the driver that the race is about to start. Finally, there is a green light near the bottom that signals the start of the race. If a driver takes off too soon (before the green light turns on), he has "jumped" or "foul" started and, instead of a green light being turned on, a red light is turned on. This means the driver has been disqualified and loses the race. Each lane has its own set of lights that control the start of the car in that lane.

A typical race starts by having both cars slowly approach the starting line. As each lane's pre-stage light beam is broken, the Christmas tree pre-stage (top) bulbs are turned on. As the cars creep forward, they each break the staging light beams and the Christmas tree state ($2^{nd}$) bulbs are turned on. At this point, a person called the "starter", who is standing near the starting line between the lanes, flips a switch and the countdown of the amber lights on the Christmas tree begins. Any time after the green lights turn on, the cars may leave the starting line and race down the track.

It is obvious that if a car takes off the instant its green light turns on, it will have an advantage over its opponent. Because the vehicle and the driver have a "response" or "reaction" time from when the driver sees the green light turning on until when the car start to move, he will typically try to take off before the green light actually turn on. This often results in a "foul" or red light start. It is well documented that if a driver takes off by using one of his amber warning lights or even his opponent's amber warning lights as a reference, and then using an electronic delay timer to prevent his car from leaving the starting line until the precise moment, he will be assured of having a better start. Such electronic delay timers are known as "Reaction Time Delays" or "Delay Boxes" and they are widely used in the sport. Prior art describes their function and design. See U.S. Pat. Nos. 4,467,219; Re 32,474; 5,652,468 to Reid U.S. Pat. No. 5,600,185 to Hamma. Each of these four U.S. Pantents is incorporated by reference in this application.

Historically, drag racing started with two similarly classed cars starting at the same time and racing to the end of the track. The first car to reach the finish line won the race. This is known as "Heads Up" racing. Usually, the car having the most expensive and modern equipment won. Due to the high cost of racing in this manner, a new form of racing was created known as "Bracket" or "Handicap" racing.

In this form of racing, the driver decides how quick his car will go. The amount of time that it takes for the car to travel down the quarter mile is called the E.T. or elapsed time, and when a driver decides how fast his car will go, his selection is called his "dial in". He typically writes the "dial in" on his car somewhere in large numbers with shoe polish. The personnel in the timing tower see the "dial in" and they program the Christmas tree with both competitors' "dial ins".

The Christmas tree now counts down in a staggered fashion based upon the "handicap" or the difference between the two dial ins. The slower car gets to leave first and the theory is that if both cars run exactly on their dial in, they will cross the finish line at the same time. In order to prevent cheating by selecting a dial in much slower than the car is capable of, a car and driver are disqualified if they run quicker than their dial in. Thus, although a car may cross the finish line before its competitor, it could lose the race by being disqualified for going too quickly. The method to winning in this type of racing is to be the first car to cross the finish line without going faster than the dial in.

This type of drag racing is the most popular because it gives everyone a chance to race. Widely different performance level cars can race against each other and each has an equal chance of winning. This brings down the cost of racing to an affordable level for all competitors.

In an attempt to bring a more professional look to "bracket" or "handicap" racing, a product was introduced several years ago that consists of numbers mounted in an enclosure. The enclosure is attached to the car. The numbers can be mechanically changed by turning a knob for each digit until the desired number appears. The "dial in" can thus be set on this unit and read by the timing tower personnel. The appearance is much more uniform and professional than writing on the car with shoe polish.

SUMMARY OF THE PRESENT INVENTION

The various embodiments of the inventions described in this application each comprises an electronic lighted display unit that is mounted so that the E.T. or other data (such as, for example, biographical data of the driver) can be displayed and readily seen from outside of the car and at varied distances and angles with respect to the car.

The lighted unit includes lamps that are arranged in the form of numbers or letters and are driven by electronic circuits. The "dial in" numbers or other data can be programmed into a set of thumbwheels that transmit and electronically convert the programmed numbers or data into a pattern of lamps in the unit. The lamps create large externally visible digits in the remote display unit.

An advanced version of the remote display automatically sends out data from the settings programmed into the delay box itself.

An alternative to remotely displaying the dial-ins is to transmit the data directly to the timing tower so that the tower personnel would not have to enter the dial-ins into the timing tower timers. The most practical method is to send the data from the vehicle via radio signals or optically with optic transmitters and receiver photocells or by a magnetic transmission system.

This invention provides multiple improvements over the prior art.

The display unit is lighted, which makes night viewing especially easy.

The remote setting unit can be mounted near the driver in easy reach, and the display unit can be mounted anywhere.

An advanced embodiment is a direct connection with a "Delay" box such that when the driver enters his dial in into the "Delay" box, the "Delay" box automatically sends that data out to the display unit for display.

Further embodiments include a unit that sends the "dial-in" data directly to the timing tower via radio or optical means or magnetic means.

In accordance with the present invention a display for displaying the dial-in selection of information of a racing vehicle for use by a timing tower in racing includes a display unit having electronic driver circuits. The display unit is constructed to be mounted on a racing vehicle so that the display can be readily seen from outside of the vehicle and at varied distances and angles with respect to the vehicle.

The display includes setting apparatus for programming the numeric amount of the dial-in selection to be displayed in the display unit.

The setting apparatus can be built into the display unit itself or can be connected to the display unit by cable, by radio transmission, by an optical transmission, or by magnetic transmission apparatus.

The display unit includes lamps arranged in the form of segments of numbers or letters and the electronic driver circuits drive selected lamps to display selected data.

The lamps can be light-emitting diodes, incandescent lamps, flourescent lamps, nixie tube lamps, gas plasma lamps, liquid crystal displays, or neon lamps.

In certain embodiments of the invention brightness level control means adjust the brightness of the display unit to accommodate changes in the brightness of the ambient lighting.

Multiple display units may be mounted at different, selected locations on the racing vehicle.

The setting apparatus includes thumbwheels, push buttons, rotary switches, an electronic processor, and the electronic processor may include the delay timer means.

In certain embodiments of the invention the dial-in data is transmitted directly from the setting apparatus to the timing tower.

The dial-in data may be transmitted to the timing tower by radio transmitting means, optical transmitting means, and magnetic signal transmitting means.

In some embodiments of the invention the selectable number means include reflective numbers that can be electro-mechanically changed.

Apparatus and methods which incorporate the features described above and which are effective to function as described above comprise further, specific objects of the present invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is a top plan view of a race track and race track timing tower showing two racing vehicles lined up at a starting line about to make a run and showing additional racing vehicles at some distance behind the starting line waiting to make a run. FIG. 1 shows how each one of the racing vehicles has a display 31 constructed in accordance with the present invention for displaying to the race track timing tower selected information relating to that particular racing vehicle. The selected information may be, for example, specific elapsed time information of the racing vehicle and/or the number of the specific vehicle. Each display 31 is constructed to be mounted on the racing vehicle so that the display can be seen by the race track timing tower from the outside of the vehicle (as indicated by the sight line arrows extending from the tower to the vehicles in FIG. 1).

Figure 4:
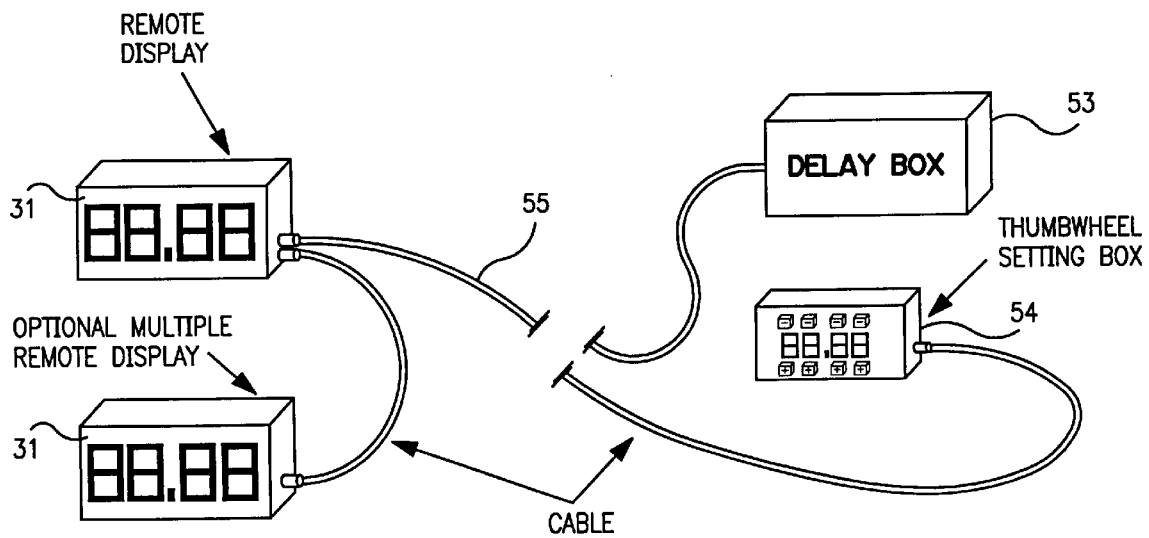

FIG. 4 is a pictorial view showing how either a delay box or a thumbwheel setting box or both the delay and thumbwheel setting box can be connected to program the numeric amount of the information in the display 31. FIG. 4 also shows how multiple displays 31 may be used to display information for viewing from the outside of the vehicle. The two displays 31 shown in FIG. 4 can, for example, be mounted on opposite sides of the racing vehicle.

Figure 5:
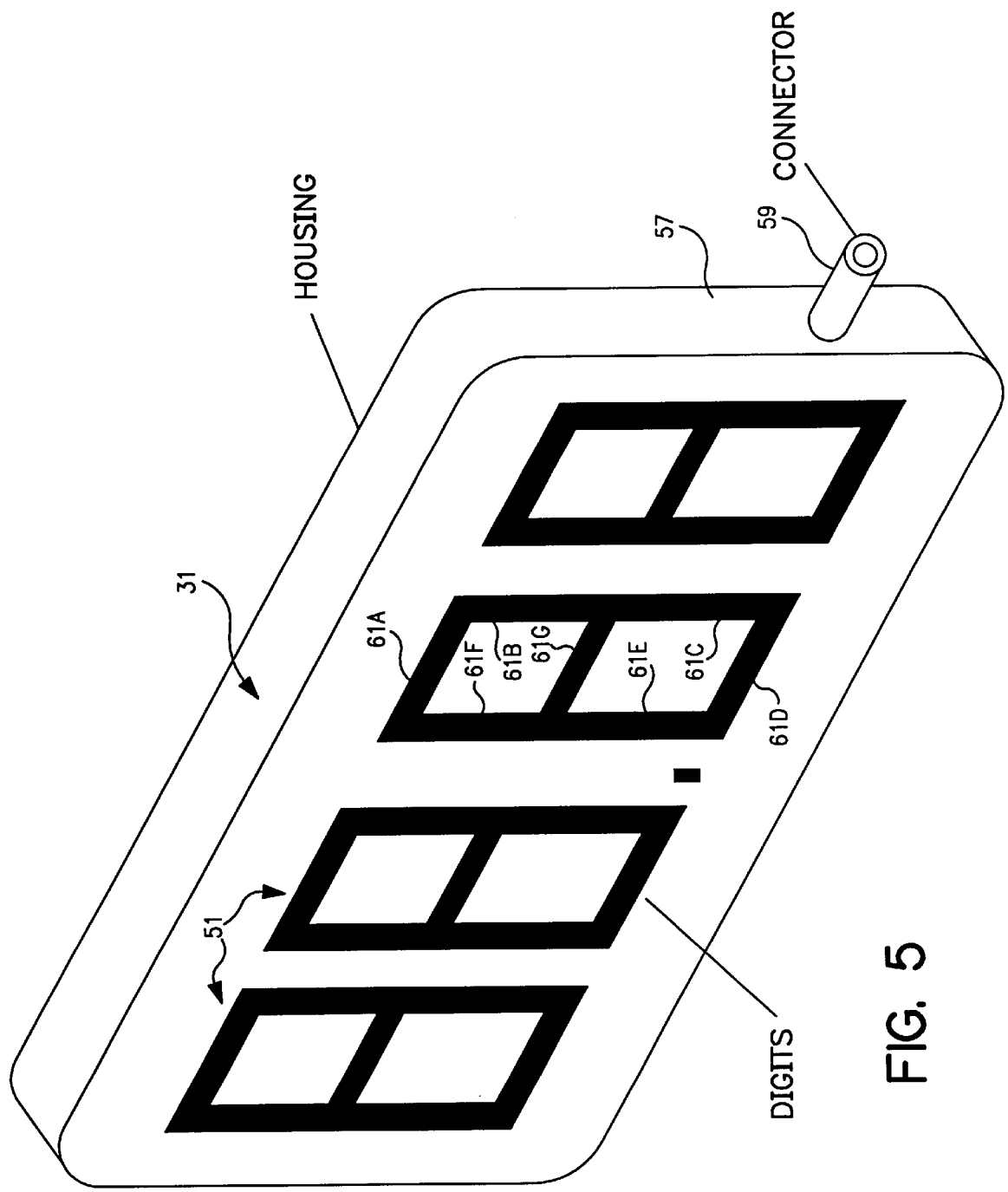

FIG. 5 is an isometric view showing a display 31 constructed in accordance with one embodiment of the present invention. FIG. 5 shows how the numbers can be made from selected lighted segments.

FIG. 6 is a pictorial view showing how a photo cell connection can be used to transmit information from a delay box to the display 31.

FIG. 7 is a pictorial view showing how photo cells can be used to transmit information from a thumbwheel setting box to a remote display 31.

FIG. 8 is a side elevation view showing an embodiment of the invention in which radio signals are used to transmit information programmed by a thumbwheel setting box in a racing vehicle from an antenna in the racing vehicle to another antenna in the race track timing tower for direct use by instruments, such as, for example, timing clocks, in the tower.

FIG. 9 is a side elevation view, generally like FIG. 8, showing how a light signal can be transmitted from a photo cell in the racing vehicle to a photo cell at the race track timing tower for transmitting certain, selected racing vehicle information from a racing vehicle to the race track timing tower.

Figure 10:
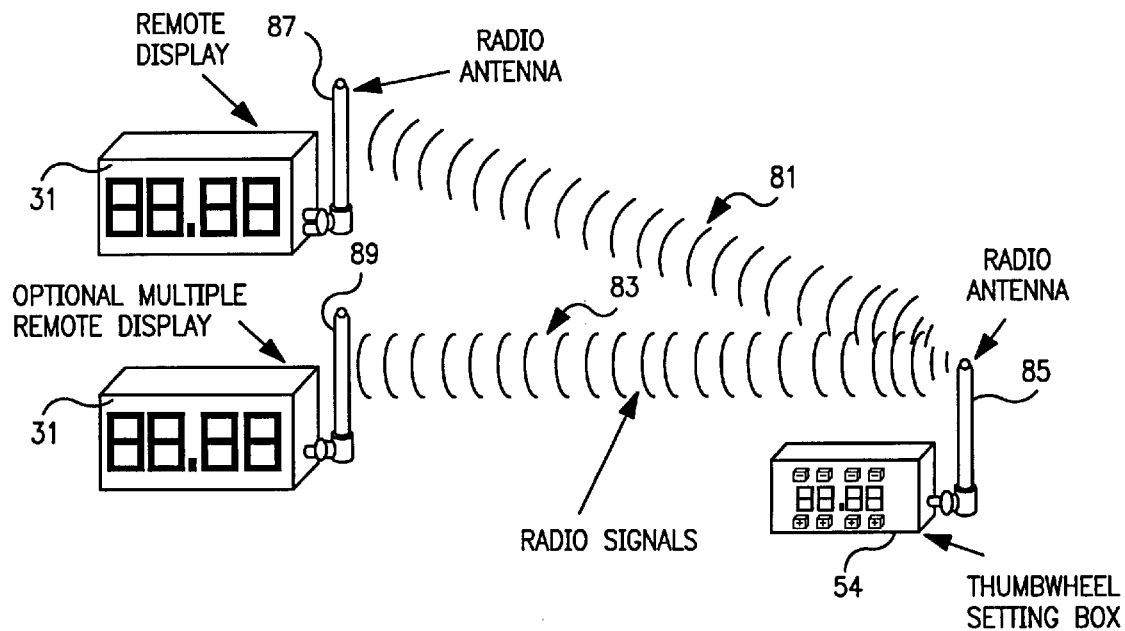

FIG. 10 is a pictorial view showing how radio signals can be used in a racing vehicle for transmitting information from a thumbwheel setting box to one or more displays 31 mounted on the racing vehicle.

Figure 11:
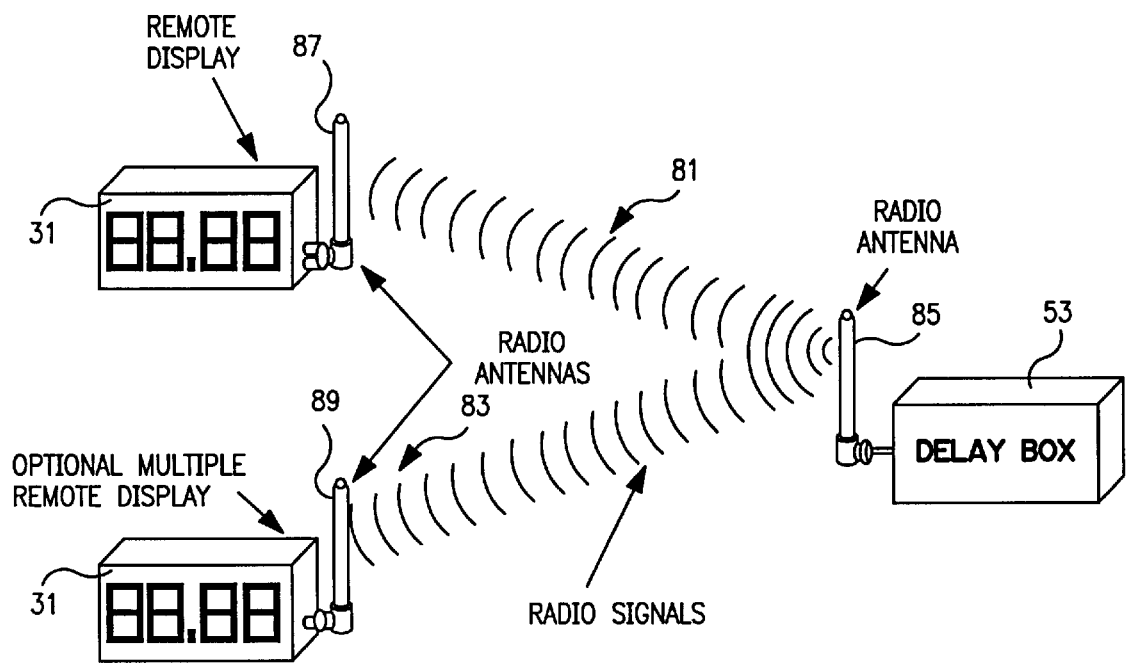

FIG. 11 is a pictorial view showing how radio signals can be used for transmitting racing vehicle information from a delay box in a racing vehicle to one or more displays 31 in the racing vehicle.

Figure 12:
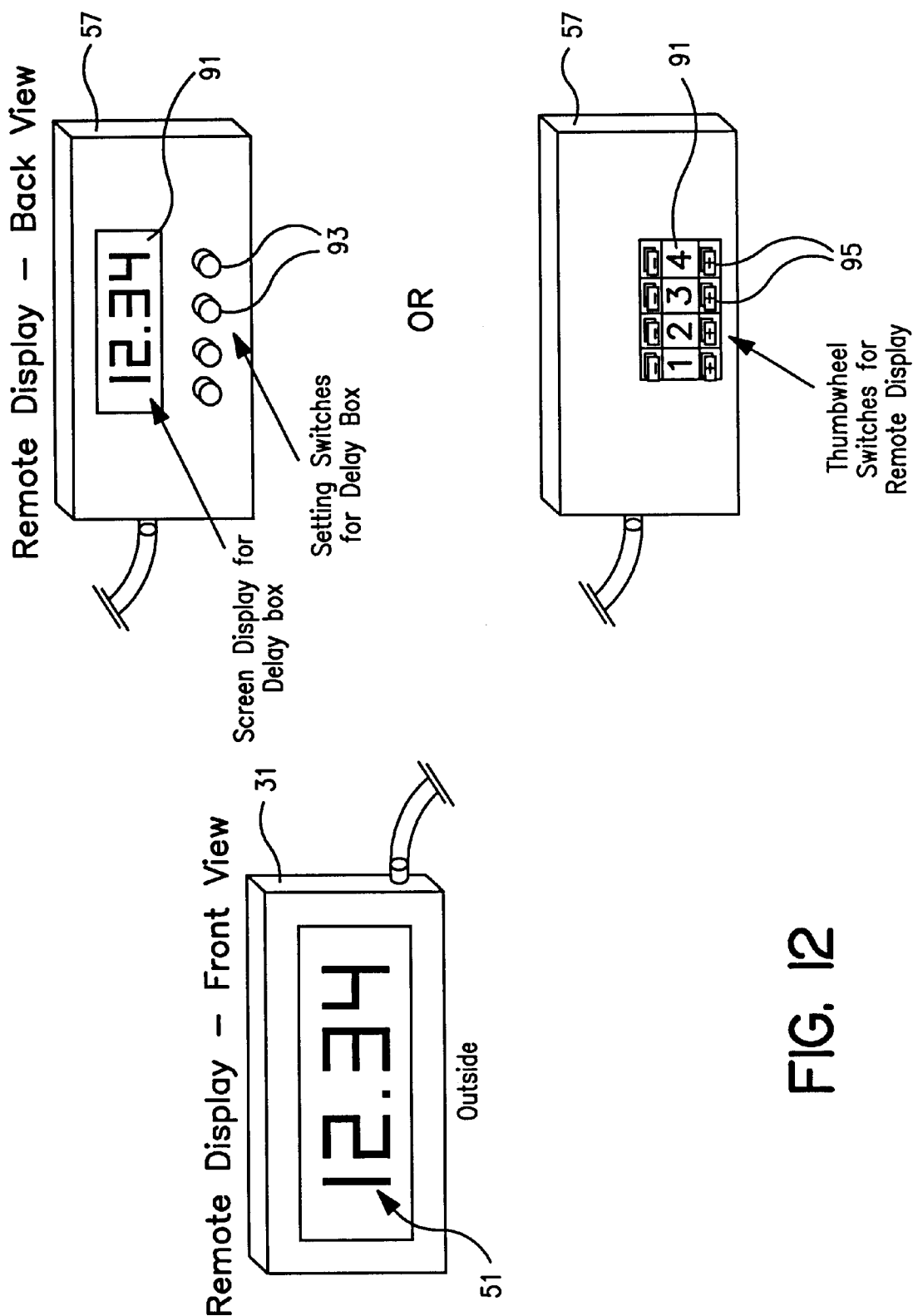

FIG. 12 is a side elevation view showing the front and back of a display 31 and shows how the setting switches for selecting certain racing vehicle information can be incorporated directly on the back side of the display 31.

Figure 13:
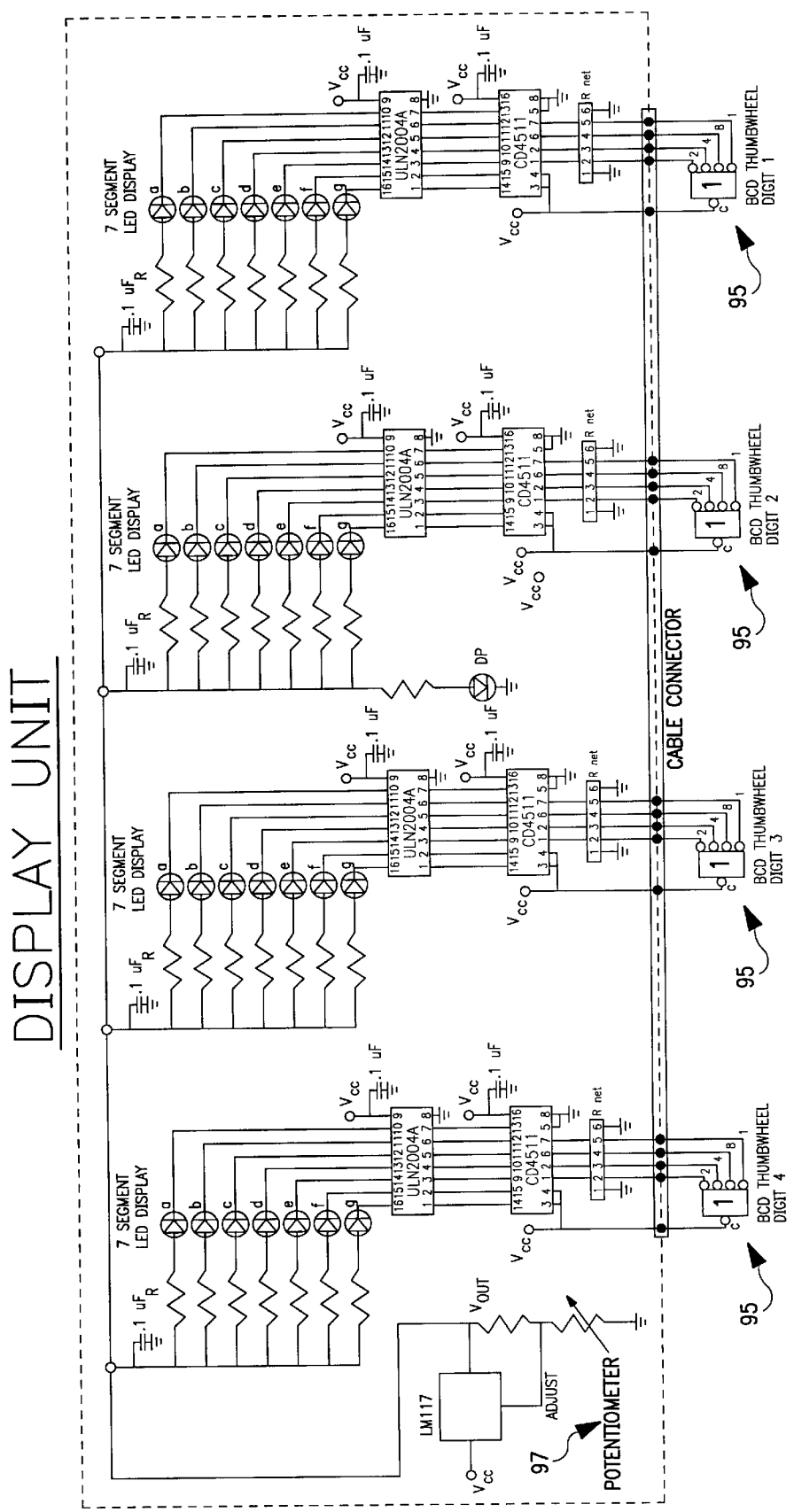

FIG. 13 is a circuit diagram showing how dial-in information relating to a racing vehicle is entered manually by means of thumbwheel switches for a light emitting diode display. FIG. 13 also shows a manual voltage regulator, on the left side of the diagram, for providing a manual level control of the display. The manual brightness level control shown in FIG. 15 can be manually adjusted to reduce the brightness of the display during low ambient light level conditions, such as, for example, night time racing.

Figure 14:
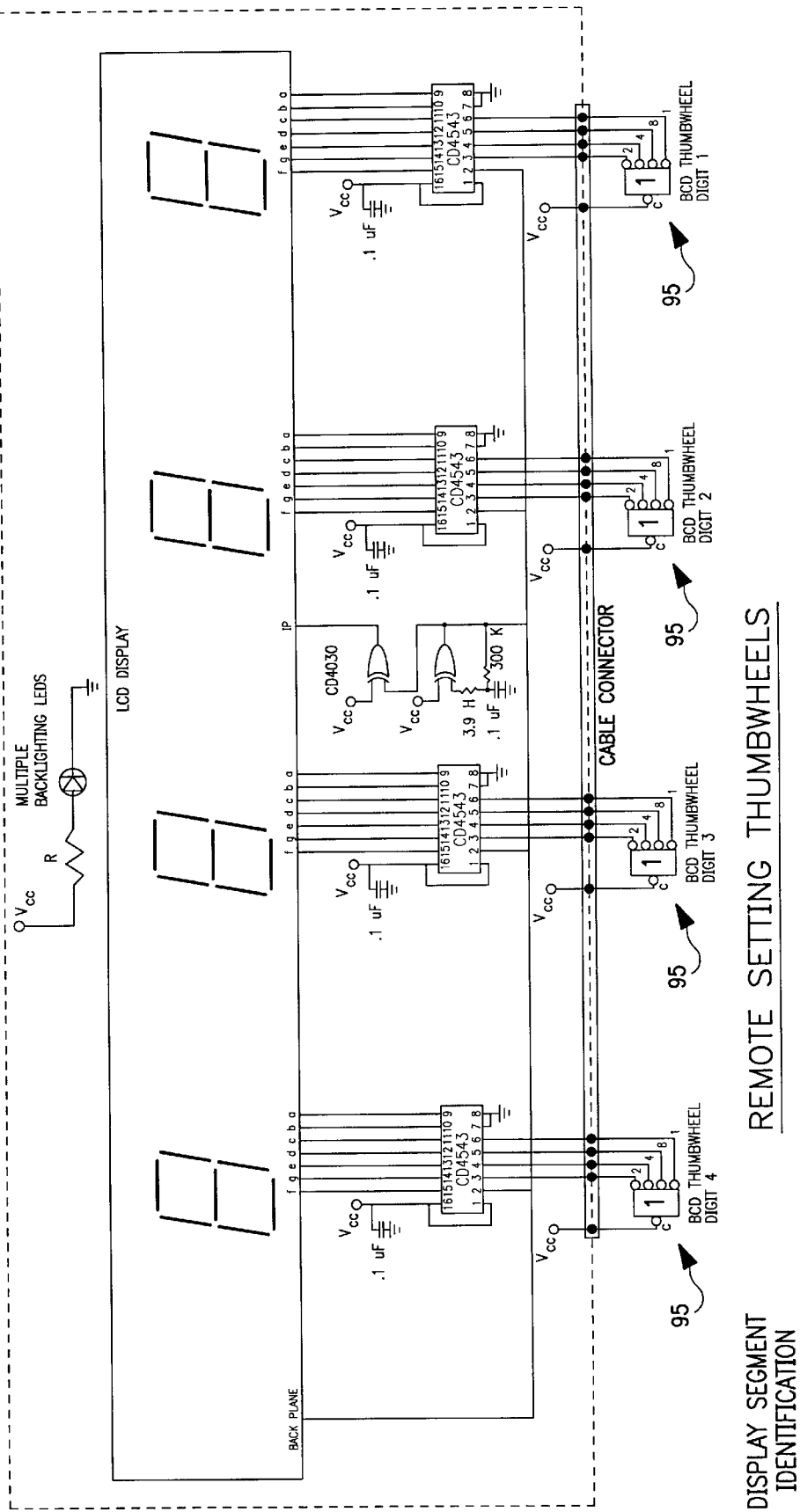

FIG. 14 is a circuit diagram for a liquid crystal (LCD) display 31 having back lighting LEDs in the display for night racing.

Figure 15:
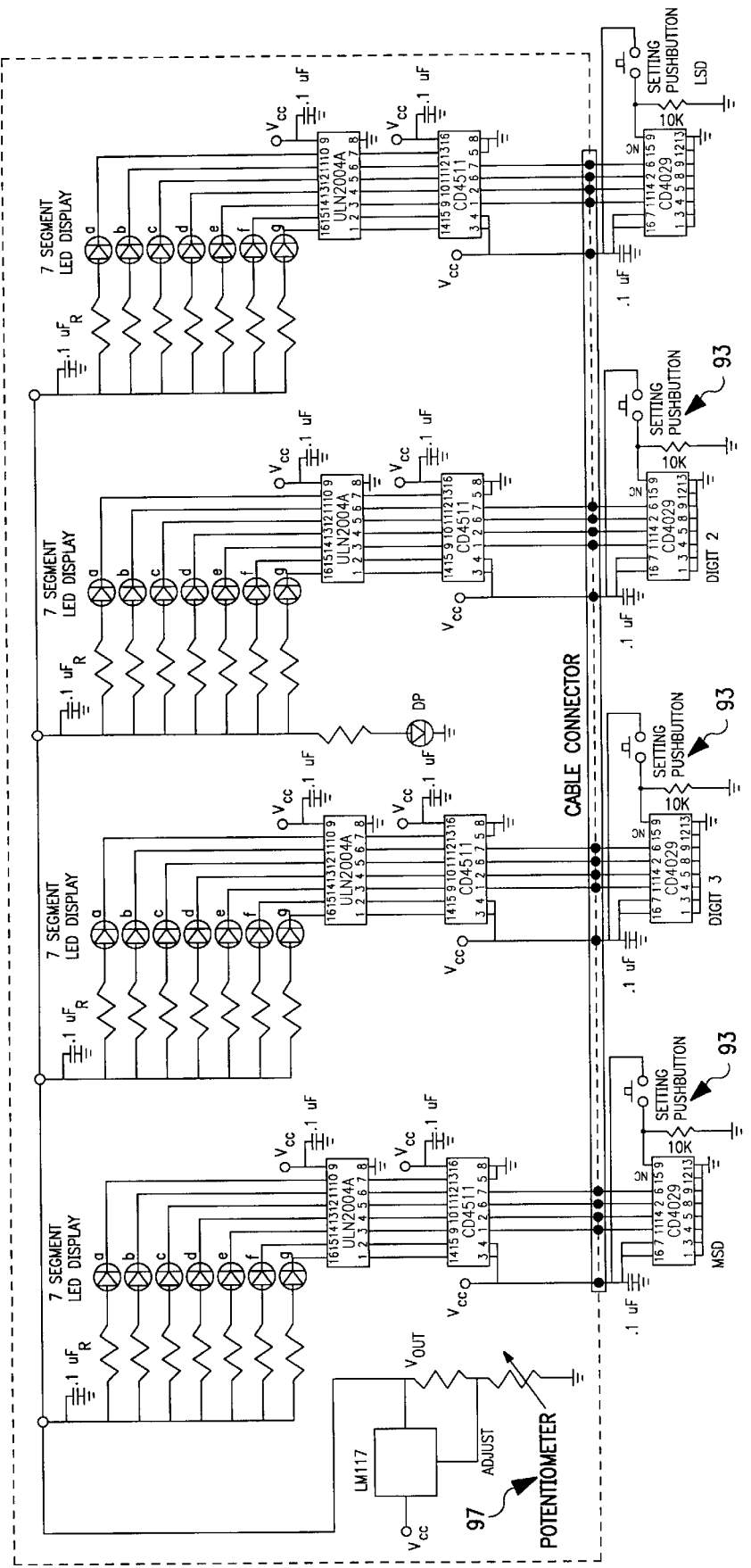

FIG. 15 is a circuit diagram (like FIG. 13) but showing how dial-in information relating to a racing vehicle is entered manually by push button settings.

Figure 16:
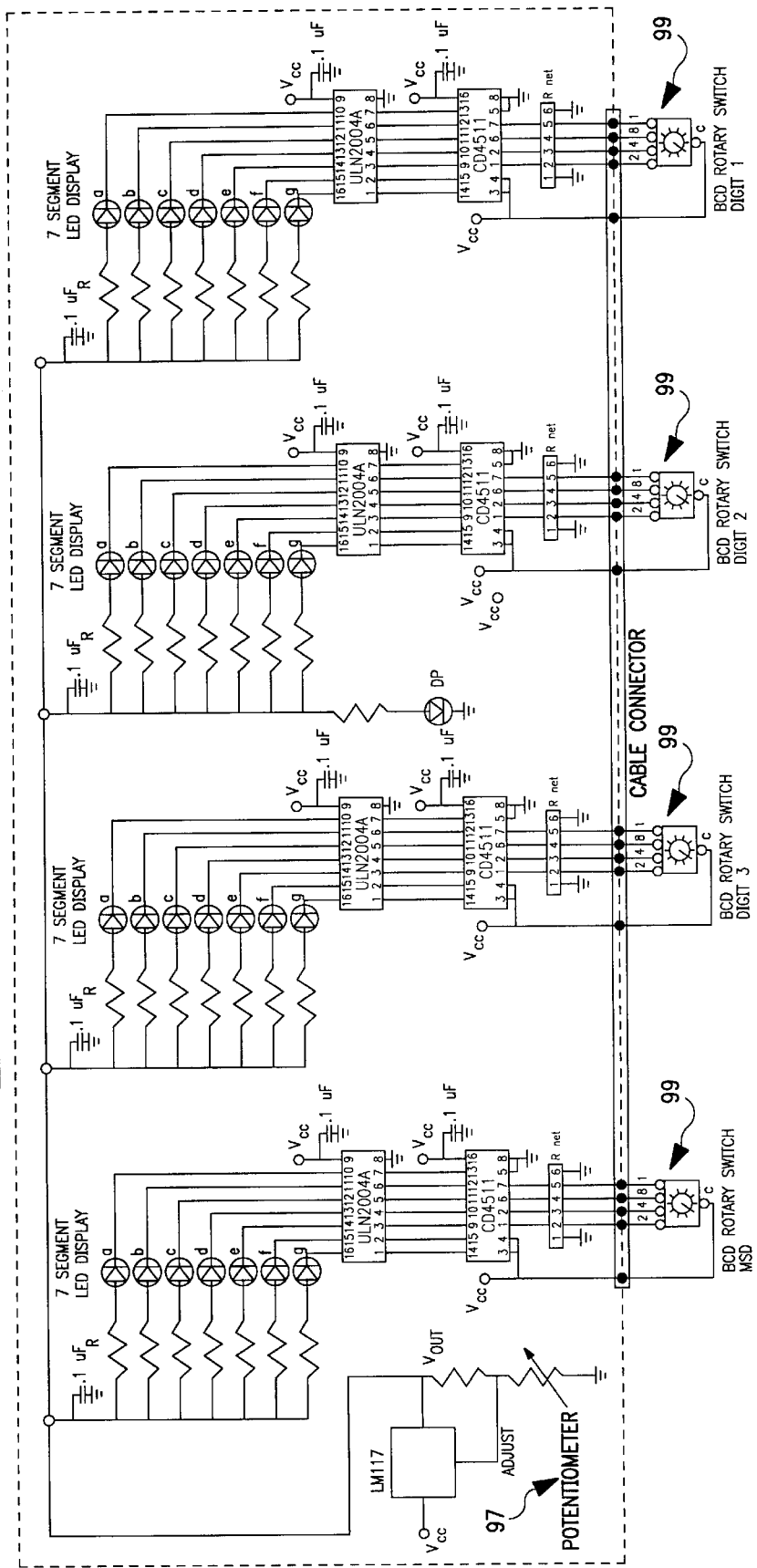

FIG. 16 is a circuit diagram (like FIG. 13) but showing how dial-in information relating to a racing vehicle is entered manually by rotary switch settings.

Figure 17:
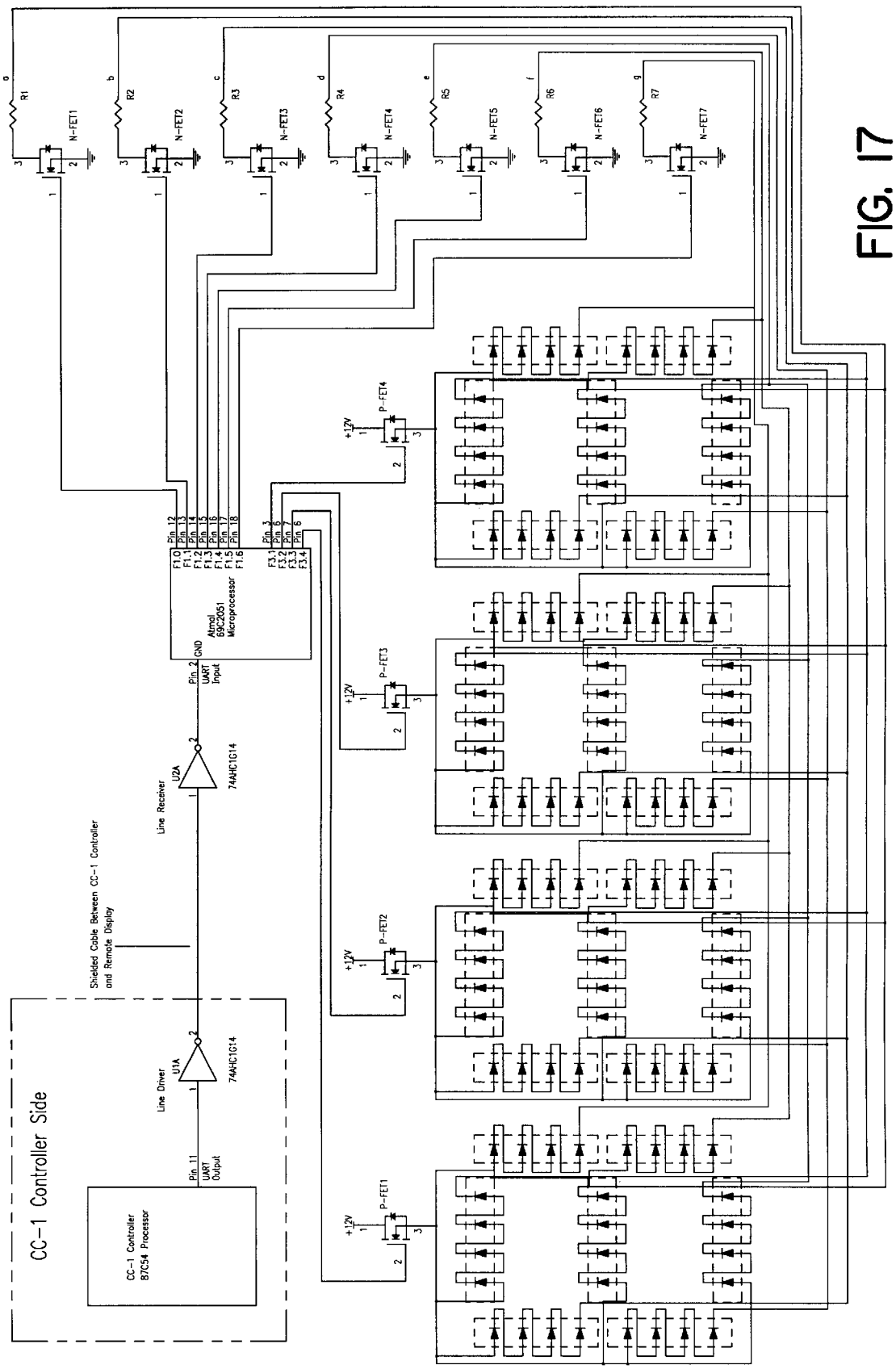

FIG. 17 is a circuit diagram for a display associated with a delay box or with any micro controller equipped unit connected to program the numeric amount of the information to be displayed in the display. In the circuit of FIG. 17 the UART output port of the micro controller sends out a serial formatted data stream that contains a dial-in number or other data. In FIG. 17 the CC-1 controller side uses the program flow shown in FIG. 19 and the microprocessor uses the program flow shown in FIG. 20.

Figure 18:
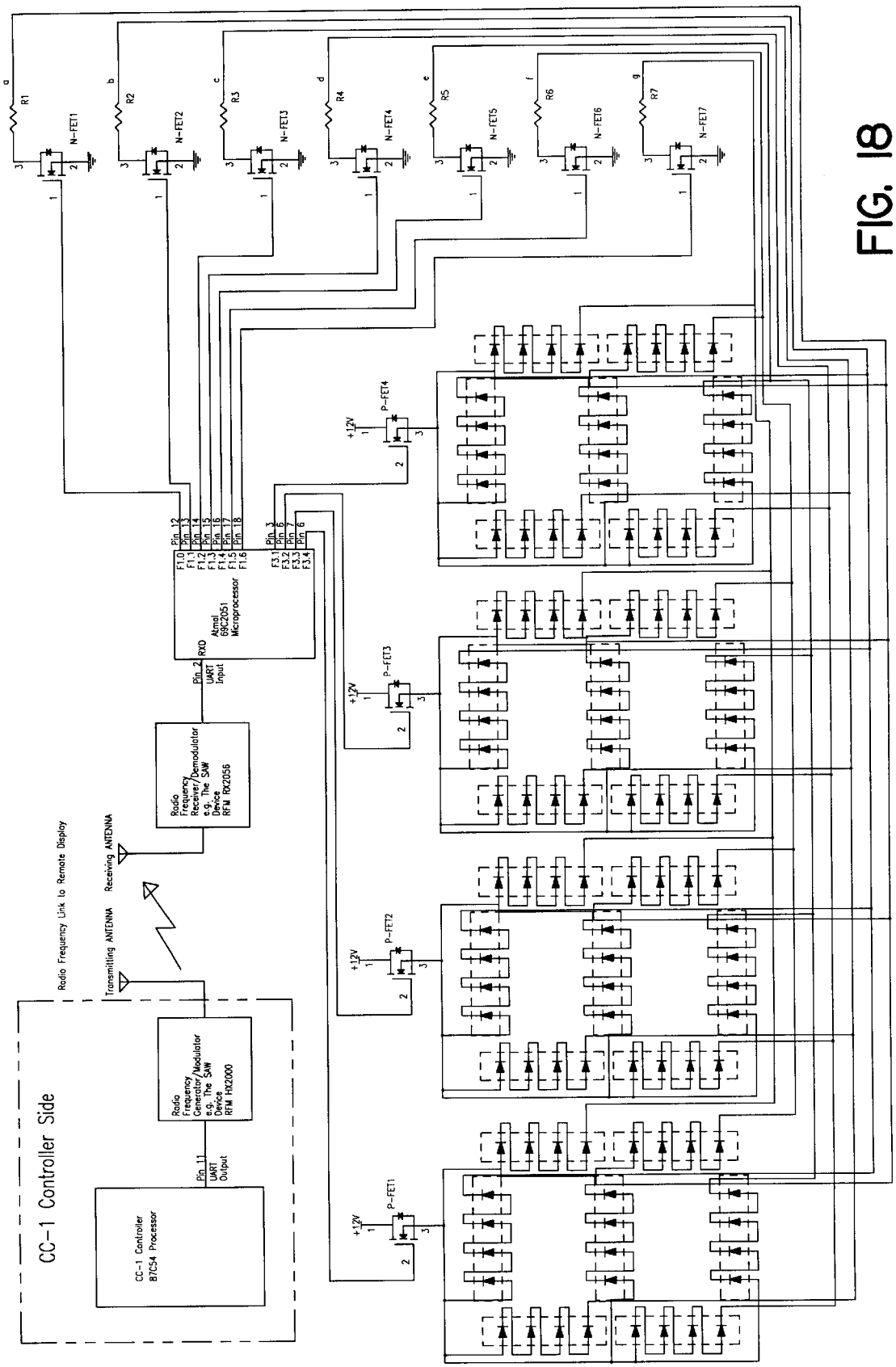

FIG. 18 is a circuit diagram similar to the circuit diagram of FIG. 17, but the circuit of FIG. 18 is constructed to transmit data by use of a radio frequency generator/modulator (part number RFM HX2000) and receiver/demodulator (part number RFM RX2056) instead of the cable shown in FIG. 16.

Figure 19:
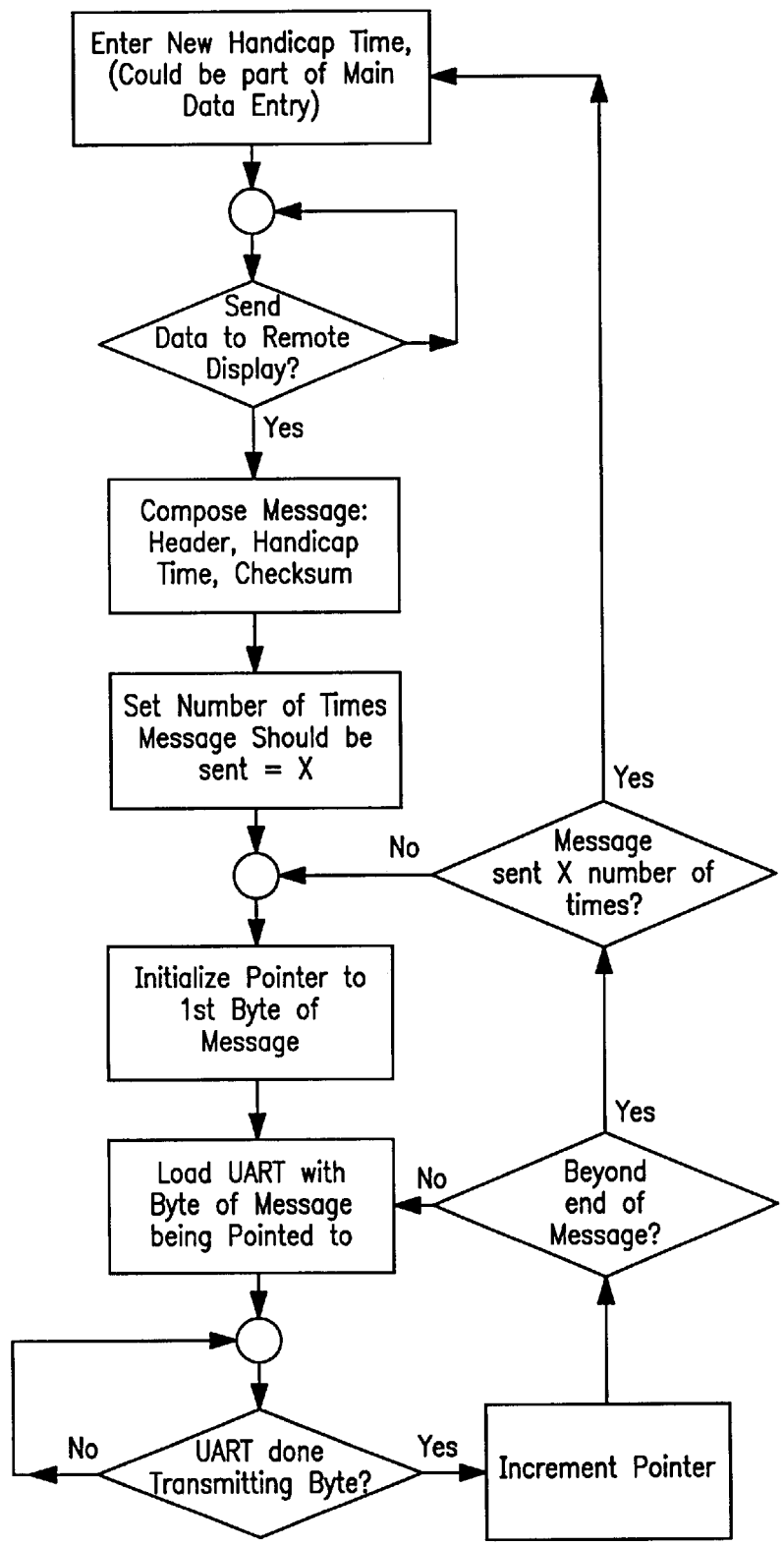

FIG. 19 is a software flow chart for an embodiment of the invention in which the processor is in the delay box.

Figure 20:
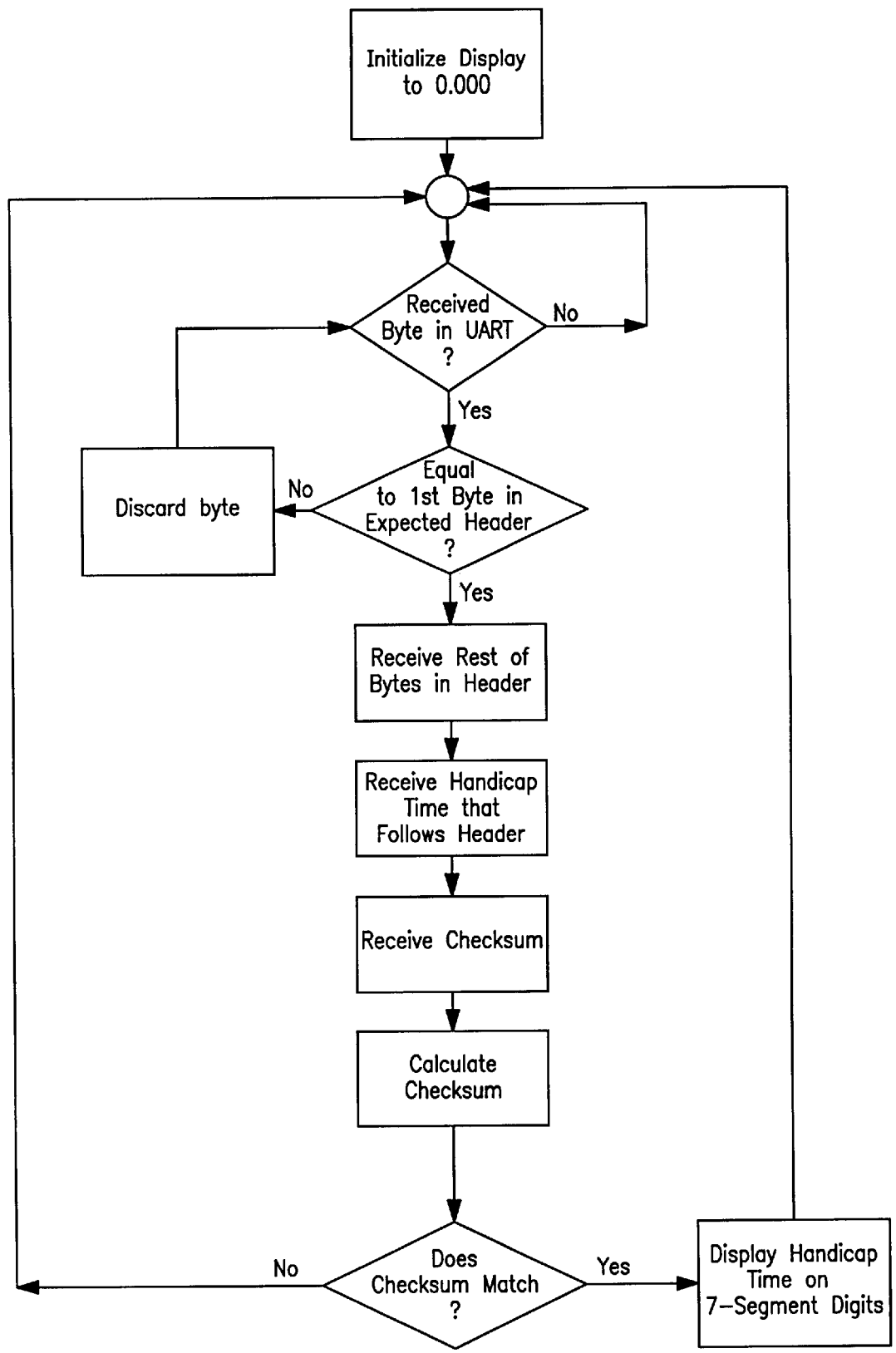

FIG. 20 is a software flow chart for an embodiment of the invention in which the unidirectional communications are in the remote display side of the link.

Figure 21:
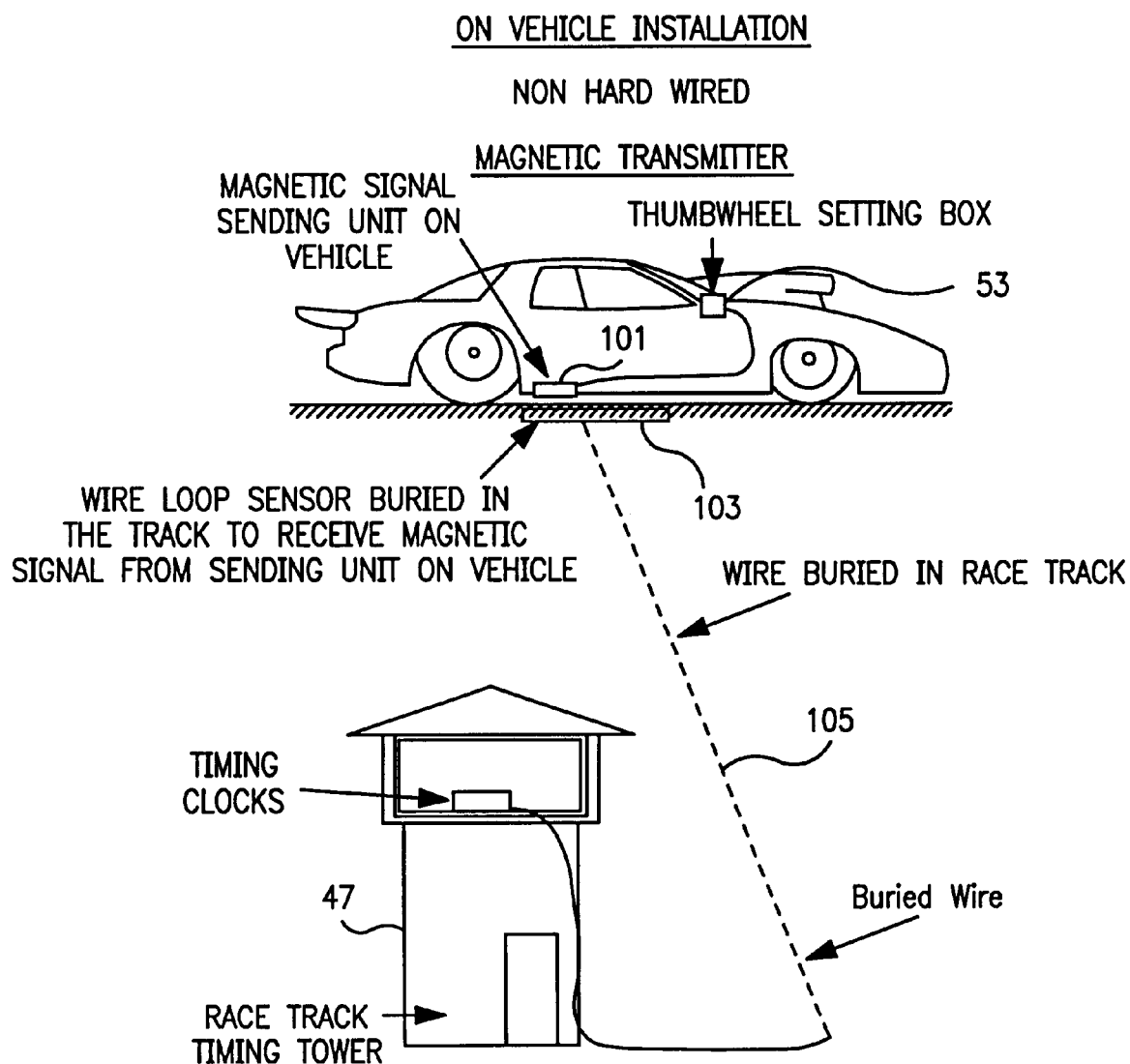

FIG. 21 is a side elevation view (similar to FIGS. 8 and 9) showing a loop sensor and wire transmission apparatus for magnetically transmitting information programmed by a thumbwheel setting box in the racing vehicle to timing clocks in a timing tower.

DETAILED DESCRIPTION OF THE PREFERRED EMBODIMENTS

Figure 1:
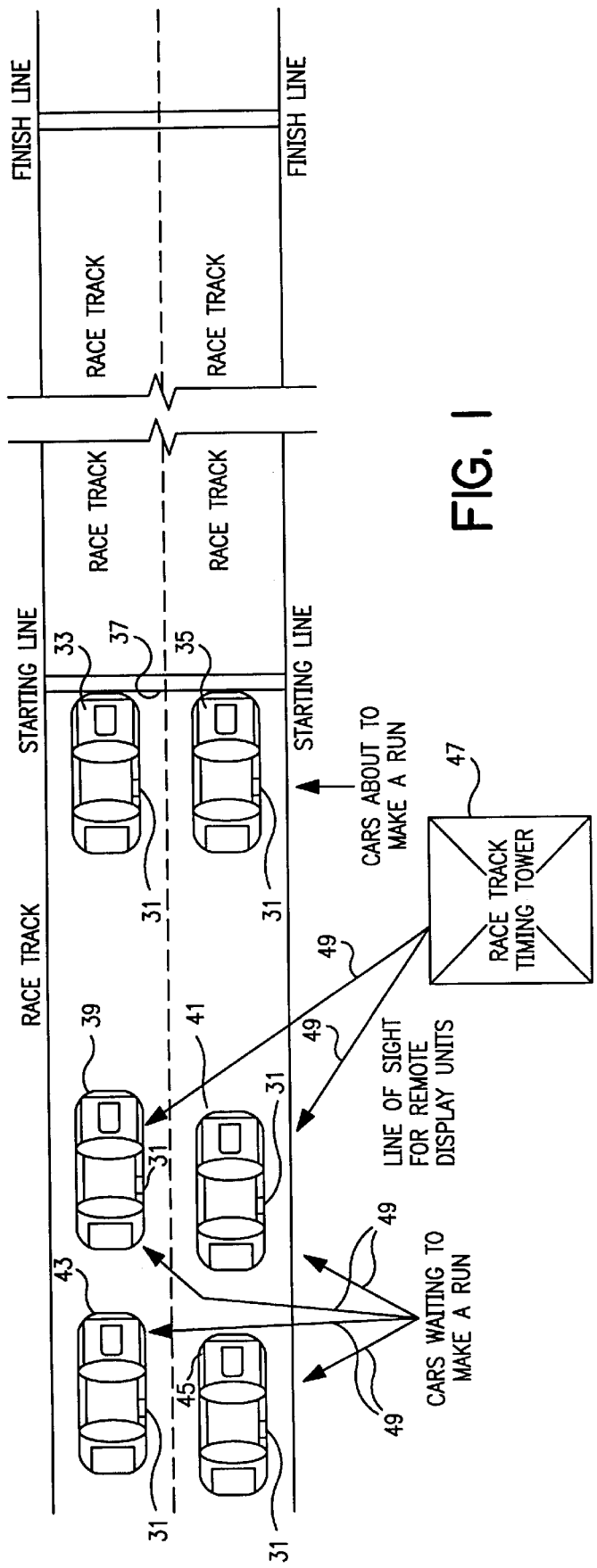

FIG. 1 is a top plan view of a race track and race track timing tower showing how displays 31 constructed in accordance with the present invention are mounted on racing vehicles so that the display can readily be seen by the race track timing tower and observers from outside of the vehicle and at varied distances and angles with respect to the vehicle.

The racing event illustrated in FIG. 1 is the start of a drag race and other racing events such as, for example, oval track racing, road racing, etc.

FIG. 1 shows two racing vehicles 33 and 35 lined up at a starting line 37 about to make a run.

FIG. 1 shows additional racing vehicles 39, 41, 43 and 45 at some distance behind the starting line waiting to make a run.

FIG. 1 shows how each of the racing vehicles has a display 31 for displaying to a race track timing tower 47 selected information relating to that particular racing vehicle. The selected information may be, for example, specific elapsed time information of the racing vehicle and/or the number of the specific vehicle.

Each display 31 is constructed to be mounted on the racing vehicle so that the display can be seen by the race track timing tower 47 from outside the vehicle (as indicated by the sight line arrows 49 extending from the tower to the vehicles in FIG. 1).

The display 31 of the present invention displays a numeric amount of a dial in selection of information. The display 31 is constructed to be mounted on the racing vehicle so that the display can be seen from outside of the vehicle.

In a preferred embodiment of the present invention the display 31 includes electronic driver circuits, as will be described in more detail below.

In preferred embodiments of the present invention, the display 31 includes lamps arranged in the form of segments of numbers 51 (see FIGS. 5 and 12) and the electronic driver circuits drive selected lamps to display selected numbers. Various types of lamps can be used. The lamps may be, for example, light emitting diodes, incandescent lamps, flourescent lamps, nixie tube lamps, glass plasma lamps, liquid crystal displays, or neon lamps.

In certain preferred embodiments of the present invention, the display 31 includes a brightness level control (as will be described in more detail with reference to FIGS. 13 and 14) for adjusting the brightness of the display unit to accommodate changes in the brightness of the ambient lighting.

As will be described in greater detail below with reference to FIG. 4, the multiple displays 31 may be mounted at different, selected locations on a single racing vehicle so that the displayed numeric information may be viewed from different sides or different ends of the racing vehicle.

This feature of the present invention is illustrated and will be described below with reference to FIG. 4.

The setting means or mechanisms for programming the numeric amount of the dial-in selection to be displayed include thumbwheels, push buttons, rotary switches, an electronic processor, and electronic delay timer means as will be described below with reference to various figures of the drawings.

Various preferred embodiments of the present invention include control means for automatically sending data to the vehicle display and/or to the race track timing tower. These transmitting means include cable connectors, radio transmitting apparatus, optical transmitting apparatus, photocells, magnetic transmission apparatus, and processing apparatus in the timing tower for automatically entering programmed numeric amount information into a computer of the timing tower, all as will be described in more detail below with reference to various figures of the drawings.

The setting means for programming the numeric amount or alphanumeric data to be displayed may be built into the display unit or may be incorporated into other structure, such as, for example, a delay timer means, in the racing vehicle.

Figure 2:
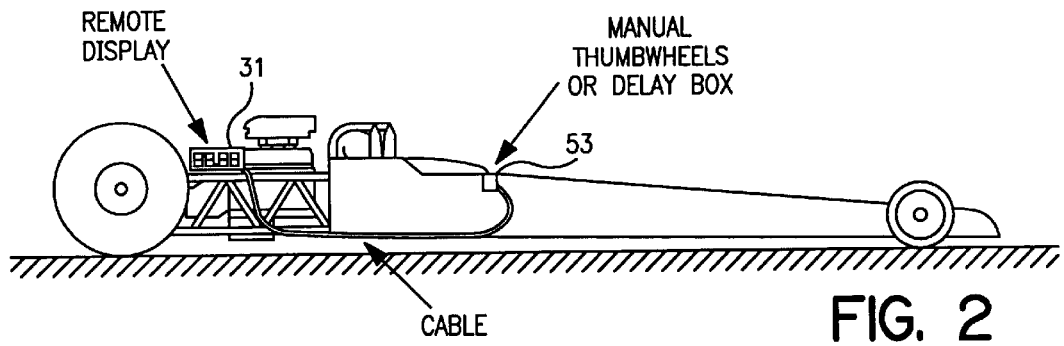
FIG. 2 is a side elevation view showing a dragster racing vehicle configuration having a remote display 31 and either manual thumbwheels or a delay box for programming the numerical amount of the racing vehicle information to be displayed in the display 31.
Figure 3:
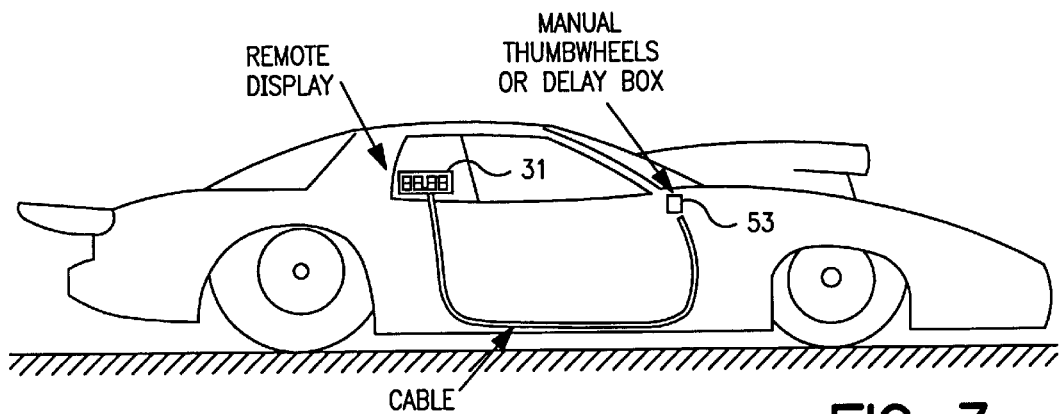
FIG. 3 is a side elevation view, generally like FIG. 2, but showing a standard automobile racing vehicle configuration having a remote display 31 and either manual thumbwheels or a delay box for programming the numerical amount of the racing vehicle information to be displayed in the display 31.

FIGS. 2 and 3 illustrate how the display of the present invention can be mounted on different kinds of racing vehicles so that the display can be seen from the outside of the vehicle.

In FIG. 2 the display 31 is shown mounted on a dragster racing vehicle. The display 31 is mounted at a location remote from the driver, but the apparatus for programming the numeric amount to be displayed is positioned within the driver's compartment within easy reach of the driver. In FIG. 2 the digits to be displayed are selected by manual thumbwheels or a delay box 53.

FIG. 3 shows a remote display mounted on a standard automobile racing vehicle. The digits to be displayed are set by manual thumbwheels or a delay box 53.

FIG. 4 is a pictorial view showing how either a delay box 53 or a thumbwheel setting box 54 is connectable by cables 55 to one or more remote displays 31.

FIG. 5 is an isometric view showing a display 31 constructed in accordance with one embodiment of the present invention. FIG. 5 shows how the display 31 comprises a housing 57, a connector 59 for connection to a cable 55 as shown in FIG. 4, and individual lamp segments 61A, 61B, 61C . . . 61G which can be selectively and independently energized by electronic driver circuits (to be described in more detail below with reference to FIGS. 13–16) in order to produce the desired digits 51 for viewing from outside the racing vehicle. The A-G segment identification is shown in the lower left hand corner of FIGS. 13–16.

In the embodiment shown in FIG. 4 the remote display 31 is directly connected to a delay box 53 by a cable 55.

FIG. 6 shows an embodiment of the present invention in which the connection is a non-hard wired connection provided by a photocell transmitter.

In the FIG. 6 embodiment a transmitting photocell 63 is associated with the delay box 53 and a receiving photocell 65 is associated with the remote display 31. A light beam 67 transmits light signals between the photocells 63 and 65 to enable the programmed information from the delay box 53 to be displayed as digital information on the face of the display 31.

FIG. 7 is a view like FIG. 6 but shows a thumbwheel setting box 54 connected to the transmitting photocell 63.

Fiberoptic cables may be used to transmit the light signal information in place of the photocells and air transmitted light signals in the systems shown in FIGS. 6 and 7. FIG. 8 shows an embodiment of the invention in which radio signals 69 are used to transmit information program by thumbwheel setting box 54 in a racing vehicle from an antennae 71 in the racing vehicle to another antennae 73 in the race track timing tower for direct use by instruments, such as, for example, timing clocks in the tower 47.

FIG. 9 is a view like FIG. 8 but shows a transmitting photocell 75 mounted on the racing vehicle and a receiving photocell 77 associated with the timing tower 47. The photocell 75 transmits information to the timing tower 47 by signals on a light beam 79.

FIG. 21 is a view like FIGS. 8 and 9 but shows a magnetic signal sending unit 101 in the racing vehicle, a magnetic sensor 103 near the starting line, and a wire 105 for transmitting information programmed by the thumbwheel setting box 53 in the racing vehicle to a timing clock in the timing tower 47. In the particular embodiment shown in FIG. 21 the magnetic sensor 103 is illustrated as a wire loop buried in the track, but other sensors, such as, for example, portable sensors, may be used.

FIGS. 10 and 11 show additional embodiments of the present invention which use non hard wired techniques for transmitting signals from setting apparatus to the remote display or displays on the racing vehicle. In these two embodiments of the present invention the hard wired cable 55 shown in FIG. 4 is replaced by non hard wired radio signal transmitting apparatus.

FIG. 10, like FIG. 7, transmits signal information from a thumbwheel setting box 54 to one or more remote displays 31.

FIG. 11, like FIG. 6, transmits signal information from a delay box 53 to one or more remote displays 31.

In both the FIG. 10 apparatus and the FIG. 11 apparatus, the signals are radio signals (illustrated by the beams 81 and 83).

In FIG. 10 a radio antennae 85 associated with the thumbwheel setting box 54 transmits the beams 81 and 83 to radio antennas 87 and 89 associated with the remote displays 31.

In FIG. 11 a radio antennae 85 associated with the delay box 53 transmits the signals on the beams 81 and 83 to radio antennas 87 and 89 associated with the remote displays 31.

FIG. 12 illustrates embodiments of the present invention in which either the setting switches for the delay box or the thumbwheel switches for the remote display can be incorporated directly on the back side of the housing 57 for the display 31. The left hand part of FIG. 12 shows the outside of the display 31 and shows how the selected digits are displayed for viewing from outside the racing vehicle.

The upper right hand part of FIG. 12 shows how the back side of the housing 57 incorporates a screen display 91 for displaying to the driver the digits selected for display on the outside of the display. Setting switches 93 are manually set by the driver to change the numeric amount of the dial-in selection of information to be displayed.

The lower right hand part of FIG. 12 shows thumbwheel switches 95 (see FIG. 12) for changing the digits to be displayed.

The electronic driver circuits (to be described in more detail below with reference to FIGS. 13 and 14) can be located within the housing 57 or can be mounted at some other location and connected to drive the display 31.

The driver circuits can also drive electromechanical flip signs instead of lamps.

A basic version of the electronic driver circuits for the display 31 is shown in the circuit diagram in FIG. 13.

The circuit diagram of FIG. 13 is for a display in which the dial-in selection of information is entered manually by means of thumbwheel switches 95 (see FIG. 12) for each digit.

Each of the four digits illustrated use the same circuitry, so the circuit for one digit only will be described.

Voltage, typically 12 volts DC, is supplied to the common terminal of a BCD (binary coded digit) thumbwheel switch 95. The switch connects the common terminal to the appropriate output bits of the switch that correspond to the number that the switch is set to. The four output bits of the BCD thumbwheel switch connect to the inputs of an industry standard CMOS BCD to seven segment display driver (part number CD4511). Each input is also connected to a "pull down" resistor that is tied to ground. These "pull down" resistors prevent the inputs of the CD4511 from electrically floating when the thumbwheel bit is not active. For cost and parts reduction reasons, the circuit shows a resistor network instead of individual resistors.

The CD4511 converts the BCD inputs into outputs which can drive a seven segment display that will show the number that corresponds to the number which has been set into the thumbwheel switch. The seven segment outputs from the CD4511 drive an industry standard transistor array (part number ULN2004A). The transistor arrays sink enough current to turn on the lamps in the display brightly. For cost and parts reduction reasons, the circuit shows a transistor array instead of individual transistors.

Individual lamps in each segment of the display are connected through a current limiting resistor to a common voltage source. When a transistor in the ULN2004A array is turned on, it connects that particular lamp to ground and current now flows in that lamp from the common voltage source, through the current limiting resistor, through the lamp, through the transistor to ground and the segment lamp will light up. The single LED in the middle is a discrete lamp for the decimal point.

Each segment lamp shown in FIG. 13 is illustrated as a single LED lamp.

Other types of lamps, such as incandescent, vacuum flourescent, nixie tube, gas plasma, etc. can also be used.

Illuminated electromechanical flip displays can also be used. The LED lamp shown in FIG. 13 is a preferred type of lamp to use for certain applications.

For schematic drawing simplicity, a single lamp is shown for each segment in FIG. 13. The display segment identification is shown in the lower left hand corner of FIG. 13 and corresponds generally to the segment identification shown in FIG. 5.

In actual practice multiple lamps per segment are used for better brightness and clarity.

Racing takes place both during the day and at night. This means that the display must be able to operate properly under all lighting conditions. During bright sunlight, the brightness of the display itself must be at maximum, however, when racing at night, this same brightness level would blast any observers. Because of this, a brightness level control is desirable. The brightness level control can be accomplished either manually or automatically.

The most practical method of dimming the brightness manually is to use a potentiometer 97 to adjust the voltage level of a voltage regulator. This changes the voltage level that is applied to the display lamps which changes the brightness of the lamps.

A method of dimming the brightness automatically is to use a sensor to measure the ambient brightness and to send a signal to the display unit that is proportional to the brightness. The display unit then changes the brightness of the display in a number of ways. The easiest way is to change the duty cycle of the drive circuits for the display lamps. In bright ambient conditions, the lamp duty cycle is 100% on to achieve maximum brightness of the display. As the ambient conditions get darker, the lamp duty cycle decreases.

FIG. 14 shows a circuit diagram for a liquid crystal display (LCD) having back lighting LEDs in the display for night racing.

The circuit shown in FIG. 14 is similar to the circuit shown in FIG. 13 except that the BCD to seven segment decoder integrated circuit has been changed to an LCD version (part number CD4543). The CD4543 directly drives a four digit LCD display. The EXCLUSIVE-OR gate (part number CD4030) in conjunction with the 3.9M resistor, 300K resistor, and the 0.1 uF capacitor creates a square wave oscillator that drives the backplane of the LCD display. The additional CD4030 gate is an inverter that inverts the square wave output and is used to drive the display point of the LCD display. The LED shown at the top of the display unit represents a series of LEDs that are used to back light the LCD so that it can be seen at night. Other types of LCD lighting is often used, but in the race car environment, LED lighting is thought to be the best design.

FIG. 15 is a circuit diagram similar to FIG. 13 but showing push buttons 93 for setting the dial-in information to be displayed.

FIG. 16 is a circuit diagram view like FIG. 13 but showing rotary setting switches 99 for manually setting the dial-in information to be displayed.

FIG. 17 is a circuit diagram for a display associated with a delay box or any micro controller equipped unit connected to program the numeric amount of the information to be displayed in the display. This circuit is specifically designed to work with a delay box manufactured by Dedenbear Products, Inc.; however, the principle is the same with any micro controller equipped unit.

The circuit shown in FIG. 17 is, for example, useable with the delay box and cable connector arrangement shown in FIG. 4.

In the circuit shown in FIG. 17 the UART output port of the micro controller sends out a serial formatted data stream that contains the "dial-in" number or other data. The port is connected to the input of a line driver integrated circuit (part number 74AHC1G14 manufactured by Texas Instruments) which is contained inside the delay box. A cable is connected to the output of the driver and is run out to the remote display unit.

The cable connects to the input of a line receiver integrated circuit (part number 74AHC1G14) inside the remote display unit. The output of the line receiver is connected to the input UART port of an Atmel 89C2051 microprocessor. The UART decodes the data and sends the "dial-in" numbers or other data to the processor part of the 89C2051. The processor output ports send signals out that are used to turn on MOSSFET transistors. These transistors drive a series of lamps arranged in a seven segment design as described above. The design shows LEDs with current limiting resistors although other types of displays could easily be used as described above. This design does not utilize direct drive of each segment, but rather uses multiplexing to drive each digit. There are seven segment drivers (N channel FETs) that turn on each of the seven segments. There are four digit drivers (P channel FETs) that drive (turn on) each digit. In operation, a single digit is turned on by the processor and then the appropriate segments are turned on to show the correct number for that digit. The digit is turned off, and the next digit in line is turned on. The appropriate segments are turned on to show the correct number for that digit. This process is repeated over and over again at a fast rate of speed so that the strobing of each digit is not visible to the human eye.

FIG. 18 is a circuit diagram similar to the circuit diagram of FIG. 17, but the circuit of FIG. 18 is constructed to transmit data by use of a radio frequency generator/modulator (part number RFM HX2000) and receiver/demodulator (part number RFM RX2056) instead of the cable shown in FIG. 16. The data can also be transmitted by magnetic sensors. See FIG. 21.

The circuit shown in FIG. 18 can be used, for example, with the non hard wired radio signal construction shown in FIG. 8 in which the racing vehicle transmits radio signals from an antennae 71 in the car to an antennae 73 in a timing tower and in the magnetic signal transmission shown in FIG. 21.

FIG. 19 is a software flow chart for an embodiment of the invention in which the processor is in the delay box. The program flow illustrated in FIG. 19 is used with the cc-1 controller side processor shown in the upper left hand corner of FIG. 17.

FIG. 20 is a software flow chart for the embodiment of the invention in which the unidirectional communications are in the remote display side of the link. For the ultimate in reliability of data transmission, bidirectional communications can be used, but in many applications bidirectional communications are not necessary. The program flow shown in FIG. 19 is useable with the microprocessor in the receiver side of the circuitry shown in FIG. 17.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

What is claimed is:

1. A display for displaying the dial-in selection of information of a racing vehicle for use by a timing tower in racing, said display comprising, a display unit for displaying a numeric amount or alphanumeric data of a dial-in selection of information pertaining to a particular race vehicle in a race, to be sued by at least an observer in said timing tower, said display including electronic driver circuits, said display unit being constructed to be mounted on a racing vehicle so that the display can be readily seen from the outside of the vehicle and at varied distances and angles with respect to the vehicle, setting means for programming the numeric amount of the dial-in selection to be displayed in the display unit, and wherein the setting means include an electronic processor for programming the numeric amounts, electronic delay timer means for controlling one or more selected functions of the racing vehicle to help prevent the racing vehicle from leaving the starting line until the moment when the race starts, said delay timer means being connected to the display unit, and wherein the electronic processor is in the display unit.

2. The invention defined in claim 1 wherein the setting means are built into the display unit.

3. A display for displaying the dial in selection of information of a racing vehicle for use by a timing tower in racing, said display comprising, a display unit for displaying a numeric amount or alphanumeric data of a dial-in selection of information, said display including electronic driver circuits, said display unit being constructed to be mounted on a racing vehicle so that the display can be readily seen from the outside of the vehicle and at varied distances and angles with respect to the vehicle, said display including setting means for programming the numeric amount of the dial in selection to be displayed in the display unit, and wherein the setting means include an electronic processor for programming the numeric amounts, and said display including electronic delay timer means to help prevent the racing vehicle from leaving the starting line until the moment when the race starts, and wherein the electronic processor is in the delay timer means.

4. The invention defined in claim 3 including control means for automatically sending data to the display unit from settings programmed into the electronic delay timer means.

5. The invention defined in claim 3 wherein the setting means are built into the display unit itself.

6. The invention defined in claim 3 including connecting means connecting the setting means with the display unit for transmitting the programmed numeric amount to the display unit.

7. The invention defined in claim 3 wherein the display unit includes lamps arranged in the form of segments of numbers or letters and wherein the electronic driver circuits drive selected lamps to display selected numbers or letters.

8. The invention defined in claim 7 wherein the lamps are light emitting diodes.

9. The invention defined in claim 7 wherein the lamps are incandescent lamps.

10. The invention defined in claim 7 wherein the lamps are vacuum flourescent lamps.

11. The invention defined in claim 7 wherein the lamps are nixie tube lamps.

12. The invention defined in claim 7 wherein the lamps are gas plasma lamps.

13. The invention defined in claim 7 wherein the lamps are liquid crystal displays.

14. The invention defined in claim 7 wherein the lamps are neon lamps.

15. The invention defined in claim 7 wherein the lamps are flourescent lamps.

16. The invention defined in claim 7 including brightness level control means for adjusting the brightness of the display unit to accommodate changes in the brightness of the ambient lighting.

17. The invention defined in claim 3 including multiple display units so that the multiple display units may be mounted at different, selected locations on the racing vehicle and wherein connecting means connect the setting means with each of the multiple display units.

18. The invention defined in claim 3 wherein the setting means include thumbwheels for converting the programmed numeric amounts into a pattern of lamps in the display unit.

19. She invention defined in claim 3 wherein the setting means include push buttons for converting the programmed numeric amounts into a pattern of lamps in the display unit.

20. The invention defined in claim 3 wherein the setting means include rotary switches for converting the programmed numeric amounts into a pattern of lamps in the display unit.

21. The invention defined in claim 3 wherein the display unit displays the number of the racing vehicle.

22. The invention defined in claim 3 wherein the display unit includes illuminating means for providing a display of the numeric amount that can be seen under all ambient lighting conditions including the lighting conditions existing during nighttime racing.

23. The invention defined in claim 22 wherein the illuminating means are adjustable.

24. The invention defined in claim 22 wherein the selectable number means include reflective numbers that can be electro-mechanically changed.

25. The invention defined in claim 24 wherein the setting means include thumbwheels for converting the programmed numeric amounts into reflective numbers in the display unit.

26. The invention defined in claim 24 wherein the setting means include push buttons for converting the programmed numeric amounts into reflective numbers in the display unit.

27. The invention defined in claim 24 wherein the setting means include rotary switches for converting the programmed numeric amounts into reflective numbers in the display unit.

28. The invention defined in claim 6 wherein the connecting means include cable.

29. The invention defined in claim 6 wherein the connecting means include light signal transmitting means.

30. The invention defined in claim 6 wherein the connecting means include radio signal transmitting means.

31. The invention defined in claim 6 wherein the connecting means include magnetic signal transmitting means.

32. A display for displaying selected information of a racing vehicle for use by a timing tower in racing, said display comprising,
   a display unit for displaying a numeric amount or alphanumeric data,
      said display unit including electronic driver circuits,
      said display unit being constructed to be mounted on a racing vehicle so that the display can be readily seen from the outside of the vehicle and at varied distances and angles with respect to the vehicle,
      electronic delay timer means for controlling one or more selected functions of the racing vehicle,
         said delay timer means being connected to the display unit,
         including setting means for programming the information to be displayed in the display unit, and
         including transmitting means for transmitting the programmed numeric amount directly from the setting means to a timing tower.

33. The invention defined in claim 32 wherein the transmitting means comprise radio transmitting means.

34. The invention defined in claim 32 wherein the transmitting means comprise optical transmitting means.

35. The invention defined in claim 34 wherein the optical transmitting means include a photocell.

36. The invention defined in claim 34 wherein the optical transmitting means include fiber optic cable.

37. The invention defined in claim 32 wherein the transmitting means include a magnetic signal sending unit on the racing vehicle, a magnetic sensor near the starting line, and a wire running from the sensor to a timing clock in a race track timing tower.

38. The invention defined in claim 32 including a timing tower display for viewing the programmed numeric amount.

39. The invention defined in claim 32 including processing means in the timing tower for automatically entering the programmed numeric amount into a computer of the timing tower.

40. A display for displaying the dial-in selection of information of a racing vehicle for use by a timing lower in racing, said display comprising,
   a display unit for displaying a numeric amount or alphanumeric data of a dial-in selection of information pertaining to a particular race vehicle in a race, to be used by at least an observer in said timing tower,
      said display including electronic driver circuits,
      said display unit being constructed to be mounted on a racing vehicle so that the display can be readily seen from the outside of the vehicle and at varied distances and angles with respect to the vehicle,
      setting means for programming the numeric amount of the dial-in selection to be displayed in the display unit, and
         wherein the setting means include an electronic processor for programming the numeric amounts,
         electronic delay timer means for controlling one or more selected functions of the racing vehicle to help prevent the racing vehicle from leaving the starting line until the moment when the race starts,
         said delay timer means being connected to the display unit, and
         wherein the electronic processor is in a structure separate from the delay timer means and the display unit.

* * * * *

UNITED STATES PATENT AND TRADEMARK OFFICE
CERTIFICATE OF CORRECTION

PATENT NO.   : 6,411,205 B1
DATED        : June 25, 2002
INVENTOR(S)  : Dennis Reid It is certified that error appears in the above-identified patent and that said Letters Patent is hereby corrected as shown below:

<u>Column 11,</u>
Line 27, the word "sued" should read as -- used --.

Signed and Sealed this

Twelfth Day of November, 2002

Attest:

Attesting Officer

JAMES E. ROGAN
Director of the United States Patent and Trademark Office